(12) United States Patent
Jing

(10) Patent No.: US 9,906,642 B2
(45) Date of Patent: Feb. 27, 2018

(54) IDENTITY IDENTIFICATION METHOD AND APPARATUS AND COMMUNICATION TERMINAL

(71) Applicant: ZTE CORPORATION, Shenzhen, Guangdong Province (CN)

(72) Inventor: Wentao Jing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/320,256

(22) PCT Filed: Aug. 13, 2014

(86) PCT No.: PCT/CN2014/084312
§ 371 (c)(1),
(2) Date: Dec. 19, 2016

(87) PCT Pub. No.: WO2015/192450
PCT Pub. Date: Dec. 23, 2015

(65) Prior Publication Data
US 2017/0163797 A1 Jun. 8, 2017

(30) Foreign Application Priority Data
Jun. 20, 2014 (CN) .......................... 2014 1 0281624

(51) Int. Cl.
*H04M 3/42* (2006.01)
*H04M 3/22* (2006.01)
(Continued)

(52) U.S. Cl.
CPC ........... *H04M 3/2281* (2013.01); *G10L 17/02* (2013.01); *G10L 17/08* (2013.01);
(Continued)

(58) Field of Classification Search
CPC ................. H04W 12/12; H04W 12/06; H04W 29/08108; H04W 4/16; H04L 29/08756; H04M 3/42042; H04M 1/57; H04M 3/54
(Continued)

(56) References Cited

U.S. PATENT DOCUMENTS 6,266,400 B1 * 7/2001 Castagna .......... H04M 3/42204
379/88.2
7,263,347 B2 8/2007 Engelhart
(Continued)

FOREIGN PATENT DOCUMENTS

CN 102869008 A 1/2013
CN 103703371 A 4/2014

OTHER PUBLICATIONS

International Search Report and Written Opinion dated Mar. 17, 2015 for PCT Application No. PCT/CN2014/084312.
(Continued)

*Primary Examiner* — Dai A Phuong
(74) *Attorney, Agent, or Firm* — Plumsea Law Group, LLC

(57) ABSTRACT

The present disclosure discloses a method for identifying an identity, device and a communication terminal. The method includes that: a voiceprint feature of a current call object and a mobile phone number of the current call object are extracted; the identity of the current call object is identified according to the voiceprint feature and the mobile phone number. The present disclosure solves the problem in the related art that it is difficult to effectively identify the identity of a call object, thus providing a method for effectively identifying the identity of a current call object and technically reducing the probability of phone fraud on a user.

15 Claims, 4 Drawing Sheets

(51) Int. Cl.
*H04W 12/12* (2009.01)
*H04W 4/16* (2009.01)
*H04W 8/18* (2009.01)
*H04W 8/20* (2009.01)
*G10L 17/02* (2013.01)
*G10L 17/08* (2013.01)

(52) U.S. Cl.
CPC ......... *H04M 3/42059* (2013.01); *H04W 4/16* (2013.01); *H04W 8/18* (2013.01); *H04W 8/205* (2013.01); *H04W 12/12* (2013.01); *H04M 2201/405* (2013.01)

(58) Field of Classification Search
USPC ......... 455/405–408, 410–411, 414.4–414.17, 455/466
See application file for complete search history.

(56) References Cited

U.S. PATENT DOCUMENTS

| | | | |
|---|---|---|---|
| 7,512,221 B2* | 3/2009 | Toms | G10L 17/22 379/114.14 |
| 7,979,053 B2* | 7/2011 | Hsu | H04M 1/66 340/5.8 |
| 8,621,214 B2 | 12/2013 | Johnson et al. | |
| 2006/0074685 A1* | 4/2006 | Brown | G10L 17/00 704/273 |
| 2008/0089554 A1 | 4/2008 | Tabankin et al. | |
| 2008/0159488 A1 | 7/2008 | Raja | |
| 2008/0212748 A1* | 9/2008 | Stillman | G06Q 30/0214 379/88.04 |
| 2008/0215884 A1* | 9/2008 | Yonemoto | H04N 7/147 713/168 |
| 2008/0233928 A1* | 9/2008 | Han | H04M 1/274583 455/414.1 |
| 2009/0089055 A1* | 4/2009 | Caspi | H04M 3/56 704/235 |
| 2013/0137479 A1* | 5/2013 | Baek | H04M 1/274516 455/550.1 |
| 2014/0099930 A1* | 4/2014 | Yu | H04M 1/274516 455/414.1 |
| 2015/0271644 A1* | 9/2015 | Sanchez | G01C 11/34 455/456.2 |
| 2016/0066044 A1* | 3/2016 | Pearson | H04M 1/2745 725/118 |
| 2016/0247015 A1* | 8/2016 | Lee | G06K 9/00288 |
| 2017/0006445 A1* | 1/2017 | Bluvband | H04M 1/665 |

OTHER PUBLICATIONS

Extended European Search Report dated Jun. 8, 2017 for European Patent Application No. 14895110.6.

* cited by examiner

IDENTITY IDENTIFICATION METHOD AND APPARATUS AND COMMUNICATION TERMINAL

CROSS-REFERENCE TO RELATED APPLICATION(S)

This application is the U.S. National Phase application of PCT application number PCT/CN2014/084312 having a PCT filing date of Aug. 13, 2014, which claims priority of Chinese patent application 201410281624.5 filed on Jun. 20, 2014, the disclosures of which are hereby incorporated by reference.

TECHNICAL FIELD

The present disclosure relates to the field of communications, and more particularly to a method for identifying an identity and device and a communication terminal.

BACKGROUND OF RELATED ART

In today's society, there are more and more cases of defrauding by means of a mobile phone. For example, sometimes a cheater may make a call to defraud by pretending to be a family of the victim; the cheater takes various means, such as stealing the mobile phone, and using special dialing software. When the dialing software is used for calling the victim, a needed phone number may be displayed to trap the victim; and moreover, there is also a lot of virus software on a smartphone; if Trojan virus is planted on the mobile phone of the victim, it may also make a call by pretending to be a phone number that the victim knows, so it is impossible to defend effectively.

An effective solution has not been presented aiming at the problem in the related art that it is difficult to effectively identify the identity of a call object.

SUMMARY

The embodiment of the present disclosure provides a method for identifying an identity and device and a communication terminal, so as to at least solve the above problem.

According to an embodiment of the present disclosure, an identity identifying method is provided, which includes that: a voiceprint feature of a current call object and a mobile phone number of the current call object are extracted; the identity of the current call object is identified according to the voiceprint feature and the mobile phone number.

The step that the voiceprint feature is extracted includes that: voice information of the current call object is collected; the voiceprint feature is extracted according to the voice information; and the voiceprint feature is converted into a predetermined voiceprint data format.

The step that the identity of the current call object is identified according to the voiceprint feature and the mobile phone number includes that: a corresponding data record saved in an address book database is inquired according to the extracted voiceprint feature and mobile phone number; a matching result of the extracted voiceprint feature and mobile phone number and the corresponding data record is judged; and the identity of the current call object is identified according to the matching result.

The method further includes that: a new data record is added to the address book database according to the mobile phone number input by a user and the collected voiceprint feature; and/or the saved data record is imported to the address book database.

The step that the corresponding data record saved in the address book database is inquired according to the extracted voiceprint feature and mobile phone number includes that: the voiceprint feature saved in the address book database and corresponding to the mobile phone number is inquired according to the extracted mobile phone number, and/or the mobile phone number saved in the address book database and corresponding to the voiceprint feature is inquired according to the extracted voiceprint feature.

The step that the matching result of the extracted voiceprint feature and mobile phone number and the corresponding data record is judged includes that: it is judged whether there is a record about the extracted mobile phone number in the address book database, and it is judged whether the voiceprint feature corresponding to the mobile phone number and recorded in the address book database matches the extracted voiceprint feature; and/or it is judged whether there is a record about the extracted voiceprint feature in the address book database, and it is judged whether the mobile phone number corresponding to the voiceprint feature and recorded in the address book database matches the extracted mobile phone number.

The step that the identity of the current call object is identified according to the matching result includes at least one of the followings: in a condition that the matching result is that there is a record about the extracted mobile phone number in the address book database, and the voiceprint feature corresponding to the mobile phone number and recorded in the address book database matches the extracted voiceprint feature, or in a condition that the matching result is that there is a record about the extracted voiceprint feature in the address book database, and the mobile phone number corresponding to the voiceprint feature and recorded in the address book database matches the extracted mobile phone number, it is identified that the current call object has a trusted identity; in a condition that the matching result is that there is a record about the extracted mobile phone number in the address book database, but the voiceprint feature corresponding to the mobile phone number and recorded in the address book database does not match the extracted voiceprint feature, it is identified that the current call object has an untrusted identity; in a condition that the matching result is that there is a record about the extracted voiceprint feature in the address book database, but the mobile phone number corresponding to the voiceprint feature and recorded in the address book database does not match the extracted mobile phone number, it is identified that the mobile phone number of the current call object has changed; and in a condition that the matching result is that there is not a record about the extracted voiceprint feature in the address book database, and there is not a record about the extracted mobile phone number in the address book database, it is identified that address book data information of the current call object is to be added.

After it is identified that address book data information of the current call object is to be added, the method further includes that: the mobile phone number and the voiceprint feature are saved in the address book database.

After the identity of the current call object is identified according to the voiceprint feature and the mobile phone number, the method further includes that: prompt information is displayed during a call and/or after a call according to an identification result of the identity of the current call object, herein the prompt information includes at least one of the followings: a matching result of the voiceprint feature and mobile phone number and the records saved in the address book database, a matching degree between the voiceprint feature and a voiceprint feature recorded in the address book database, security risk prompt information aiming at different identification results, and the mobile phone number and other address book information corresponding to the mobile phone number.

The address book database is stored locally and/or in a remote server.

In a condition that the address book database is saved in the remote server, the method further includes that: the address book database stored locally and the address book database saved in the remote server are synchronized.

The address book database is stored locally and/or in the remote server in an encryption mode.

According to another embodiment of the present disclosure, an identity identifying device is further provided, which includes: an extracting module, which is arranged to extract the voiceprint feature of the current call object and the mobile phone number of the current call object; and an identifying module, which is arranged to identify the identity of the current call object according to the voiceprint feature and the mobile phone number.

The extracting module includes: a collecting unit, which is arranged to collect the voice information of the current call object; an extracting unit, which is arranged to extract the voiceprint feature according to the voice information; and a converting unit, which is arranged to convert the voiceprint feature into the predetermined voiceprint data format.

The identifying module includes: an inquiring unit, which is arranged to inquire the corresponding data record saved in the address book database according to the extracted voiceprint feature and mobile phone number; a judging unit, which is arranged to judge the matching result of the extracted voiceprint feature and mobile phone number and the corresponding data record; and an identifying unit, which is arranged to identify the identity of the current call object according to the matching result.

According to another embodiment of the present disclosure, a communication terminal is further provided, which includes the identity identifying device.

By extracting a voiceprint feature of a current call object and a mobile phone number of the current call object, and identifying the identity of the current call object according to the voiceprint feature and the mobile phone number, the present disclosure solves the problem in the related art that it is difficult to effectively identify the identity of a call object, thus providing a method for effectively identifying the identity of a current call object and technically reducing the probability of phone fraud on a user.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings.

SPECIFIED EMBODIMENTS

Note that, the embodiments and the features in the embodiments of the application may be combined with each other under the condition of no conflicts. The present disclosure is elaborated below with reference to the accompanying drawings and embodiments.

These steps presented in the flowchart of the accompanying drawings may be executed in a computer system like a group of computer executable instructions; and moreover, although a logical sequence is shown in the flowchart, in some cases, the presented or described steps may be performed in a sequence different from that described herein.

Figure 1:
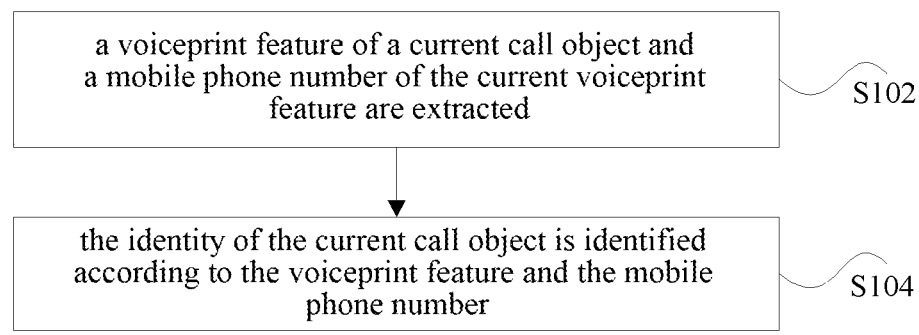
FIG. 1 is a flowchart of an identity identifying method according to an embodiment of the present disclosure.

The embodiment provides an identity identifying method, and FIG. 1 is a flowchart of an identity identifying method according to an embodiment of the present disclosure. As shown in FIG. 1, the flow includes the following steps:

Step S102: a voiceprint feature of a current call object and a mobile phone number of the current call object are extracted; and Step S104: the identity of the current call object is identified according to the voiceprint feature and the mobile phone number.

From the above steps, the identity of the current call object is identified according to the extracted voiceprint feature and the mobile phone number of the current call object, so that a method for effectively identifying the identity of a current call object is provided, which solves the problem in the related art that it is difficult to effectively identify the identity of a current call object and technically reduces the probability of phone fraud on a user.

Optionally, in Step S102, a common voiceprint extracting technology in the related art may be adopted to extract the voiceprint feature; for example, voice information (including analog audio information or digital audio information converted according to the analog audio information) of the current call object is extracted; according to the voice information, the voiceprint feature is extracted based on a predetermined feature extracting algorithm or policy; the voiceprint feature is converted into a predetermined voiceprint data format, herein the voiceprint data format may be a string of characters or numbers used for uniquely identifying the voiceprint feature, and may be directly saved in a storage system. By means of the mode, the digitization of the analog voice information is realized, or the voiceprint feature is converted into a character string or a numeric string which is available for storage and comparison.

Optionally, a caller identity display technology provided by operators may be directly adopted to extract the mobile phone number.

Optionally, in Step S104, when the identity of the current call object is identified, the following mode may be adopted: a corresponding data record saved in an address book database is inquired according to the extracted voiceprint feature and mobile phone number; a matching result of the extracted voiceprint feature and mobile phone number and the corresponding data record is judged; and the identity of the current call object is identified according to the matching result.

Optionally, the data record saved in the address book database may be added in two modes, which include that: a new data record is added to the address book database according to the mobile phone number input by a user and the voiceprint feature collected by using a terminal communication before or after the user inputs the mobile phone number; or, a packaged file of data record is obtained from an external memory, and the data record saved in the packaged file is imported to the address book database according to the packaged file.

Optionally, when the corresponding data record saved in the address book database is inquired according to the extracted voiceprint feature and mobile phone number, two modes may be adopted, for example, the voiceprint feature saved in the address book database and corresponding to the mobile phone number is inquired according to the extracted mobile phone number; or the mobile phone number saved in the address book database and corresponding to the voiceprint feature is inquired according to the extracted voiceprint feature. By means of the two modes, the voiceprint feature may be inquired according to the mobile phone number, or the mobile phone number may be inquired according to the voiceprint feature.

Optionally, judging the matching result of the extracted voiceprint feature and mobile phone number and the corresponding data record may be processed separately according to the different inquiring modes, for example, it is judged whether there is a record about the extracted mobile phone number in the address book database, and it is judged whether the voiceprint feature corresponding to the mobile phone number and recorded in the address book database matches the extracted voiceprint feature; and/or it is judged whether there is a record about the extracted voiceprint feature in the address book database, and it is judged whether the mobile phone number corresponding to the voiceprint feature and recorded in the address book database matches the extracted mobile phone number.

Optionally, after the matching result is obtained according to the above modes, at least one of the following four modes is adopted to identify the identity of the current call object according to the matching result:

in a condition that the matching result is that there is a record about the extracted mobile phone number in the address book database, and the voiceprint feature corresponding to the mobile phone number and recorded in the address book database matches the extracted voiceprint feature, or in a condition that the matching result is that there is a record about the extracted voiceprint feature in the address book database, and the mobile phone number corresponding to the voiceprint feature and recorded in the address book database matches the extracted mobile phone number, it is identified that the current call object has a trusted identity;

in a condition that the matching result is that there is a record about the extracted mobile phone number in the address book database, but the voiceprint feature corresponding to the mobile phone number and recorded in the address book database does not match the extracted voiceprint feature, it is identified that the current call object has an untrusted identity;

in a condition that the matching result is that there is a record about the extracted voiceprint feature in the address book database, but the mobile phone number corresponding to the voiceprint feature and recorded in the address book database does not match the extracted mobile phone number, it is identified that the mobile phone number of the current call object has changed; and in a condition that the matching result is that there is not a record about the extracted voiceprint feature in the address book database, and there is not a record about the extracted mobile phone number in the address book database, it is identified that address book data information of the current call object is to be added.

Herein, optionally, after it is identified that address book data information of the current call object is to be added, the mobile phone number and the voiceprint feature may also be saved in the address book database.

Optionally, after the identity of the current call object is identified according to the voiceprint feature and the mobile phone number, in order to prompt the user to notice, prompt information may be displayed during a call and/or after a call according to an identification result of the identity of the current call object, herein the prompt information includes at least one of the followings: a matching result of the voiceprint feature and mobile phone number and the records saved in the address book database, a matching degree between the voiceprint feature and a voiceprint feature recorded in the address book database, security risk prompt information aiming at different identification results, and the mobile phone number and other address book information corresponding to the mobile phone number. The user may have an intuitive appreciation through the diversified displayed information; and moreover, a voice may also be given to prompt the user to notice while the information is displayed.

Optionally, the address book database may be stored locally and/or on a remote server. In a condition that the address book database is saved in the remote server, the address book database stored locally and the address book database saved in the remote server may be synchronized regularly or at any time.

Optionally, in order to improve the security of a communication database and prevent the modification of malicious software, the address book database is stored locally and/or in the remote server in an encryption mode.

For implementing the above method, the embodiment provides an identity identifying device, which is arranged to implement the identity identifying method. Note that, the identity identifying device described in the embodiment of the device corresponds to the embodiment of the identity identifying method, the structures of specific modules or units in the device may not be public, but those skilled in the art may easily realize them by referring to the public technology and the technical content disclosed in the embodiment.

Figure 2:
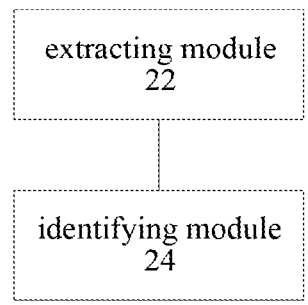
FIG. 2 is a structure diagram of an identity identifying device according to an embodiment of the present disclosure.

FIG. 2 is a structure diagram of an identity identifying device according to an embodiment of the present disclosure; as shown in FIG. 2, the device includes: an extracting module 22 and an identifying module 24; herein, the extracting module 22 is arranged to extract the voiceprint feature of the current call object and the mobile phone number of the current call object; the identifying module 24 is coupled to the extracting module 22, and is arranged to identify the identity of the current call object according to the voiceprint feature and the mobile phone number.

The modules and units involved in the embodiment of the present disclosure may be realized by means of software or hardware. The modules and units described in the embodiment may be set in a processor; for example, it may be described that: a processor includes an extracting module 22 and an identifying module 24. Herein, names of these modules do not limit the modules in some cases; for example, the extracting module 22 may also be described as "a module which is arranged to extract the voiceprint feature of the current call object and the mobile phone number of the current call object".

Figure 3:
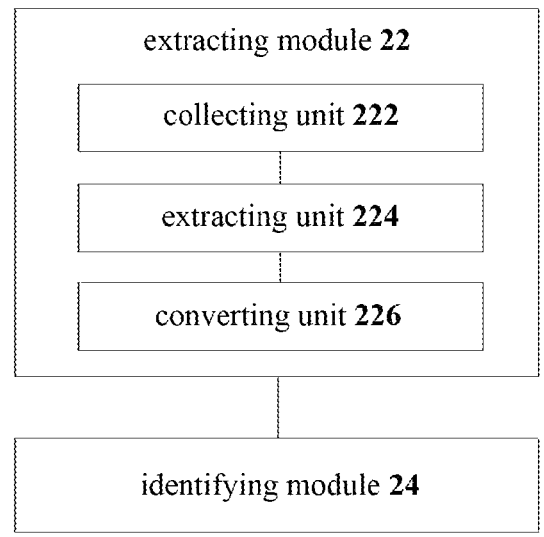
FIG. 3 is a structure diagram 1 of an identity identifying device according to an embodiment of the present disclosure.

FIG. 3 is a structure diagram 1 of an identity identifying device according to an embodiment of the present disclosure; as shown in FIG. 3, optionally, the extracting module 22 may include: a collecting unit 222, which is arranged to collect the voice information of the current call object; an extracting unit 224, which is coupled to the collecting unit 222, and is arranged to extract the voiceprint feature according to the voice information; and a converting unit 226, which is coupled to the extracting unit 224, and is arranged to convert the voiceprint feature into the predetermined voiceprint data format.

Figure 4:
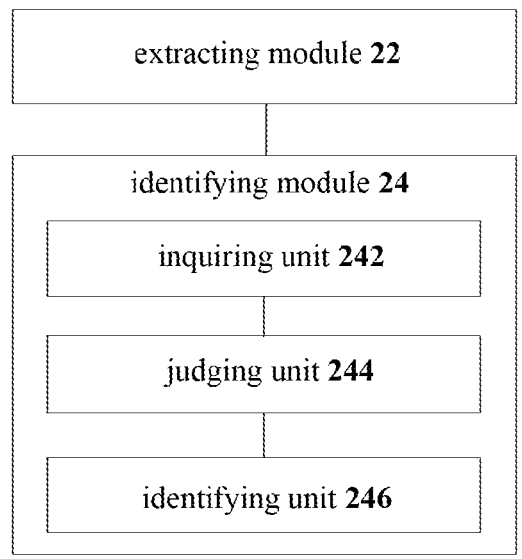
FIG. 4 is a structure diagram 2 of an identity identifying device according to an embodiment of the present disclosure.

FIG. 4 is a structure diagram 2 of an identity identifying device according to an embodiment of the present disclosure; as shown in FIG. 4, optionally, the identifying module 24 may include: an inquiring unit 242, which is arranged to inquire the corresponding data record saved in the address book database according to the extracted voiceprint feature and mobile phone number; a judging unit 244, which is coupled to the inquiring unit 242, and is arranged to judge the matching result of the extracted voiceprint feature and mobile phone number and the corresponding data record; and an identifying unit 246, which is coupled to the judging unit 244, and is arranged to identify the identity of the current call object according to the matching result.

The embodiment further provides a communication terminal, which includes the device for identifying an identity. Optionally, the communication device includes a mobile communication device, a fixed communication device and other communication devices which may be set to carry out voice communication and has a call object identifier (for example, the mobile phone number).

For making the technical solutions and implementation methods of the present disclosure more clear, the implementation process is elaborated below in combination with the embodiments.

The embodiment provides a method and device for answering a call on a mobile phone which may automatically identify a user, relating to the technical field that the real identity of a user may be automatically identified when a call is answered on a mobile phone, especially a method and device which may identify real information of a user by using a voiceprint identifying technology when a call is answered on a mobile phone, timely prompt the user, and assist the user in making correct judgement.

For solving the problem in the related art that the cheater pretends to be a user to defraud, the inventor finds that: no matter what means the cheater adopts and how absolutely lifelike he imitates the voice of others, his voiceprint feature is unique and cannot change, so the embodiment of the present disclosure may use this and designs a new function on the mobile phone to effectively prevent fraud.

Herein, the voiceprint is an acoustic spectrum carrying verbal information which is displayed by an electric acoustic instrument. The modern scientific researches show that the voiceprint has not only specificity but also the feature of relative stability. In adulthood, everyone's voice may stay the same for a long time. Experiments prove that whether the speaker imitates the voice and tone of others or whispers, even he imitates perfectly, his voiceprint is always the same. Based on the two features of the voiceprint, the investigators may inspect and compare the obtained voiceprint of a criminal with the voiceprint of a criminal suspect by means of a voice identification technology, so as to identify the criminal and provide a reliable evidence for investigating and solving a case.

The voices of people may be divided into dozens of features according to different elements. In the embodiment, these features may be converted into storable data to be saved in a database, so as to form a voiceprint database.

At present, Nuance and other manufacturers in the industry master a mature voice identifying and voiceprint identifying technology, and the technology has been applied in multiple fields. The method provided in the embodiment may creatively redesign the flow that the user answers a call in combination with the existing mid-end and high-end mobile phones, especially the smartphone with a strong processing capacity, and the existing voiceprint identifying technology, the mobile database technology and the cloud technology, so as to achieve the aim of preventing fraud by providing the user with the corresponding prompt information after identifying the identity of a caller.

In addition, for implementing a method for answering a call by automatically identifying the identity of a user, a mobile phone device is further provided in the embodiment by using the method.

To achieve the above aim, the technical solution of the embodiment of the present disclosure is implemented, in combination with the cloud technology, as follows: when the user answers a call on the mobile phone, the mobile phone records the voiceprint feature of the caller, and matches the voiceprint feature with the existing voiceprint features which are stored locally and in a cloud database, so as to automatically identify the real identity and intention of the caller by means of the comprehensive matching result of the voiceprint feature and the mobile phone number and generalize four decided results; aiming at each result, a different prompt is given to the user on the mobile phone interface, so as to assist the user to make a correct judgement.

The main features of the technical solution are as follows.

1. The mobile phone may automatically match information in an address book in combination with the voiceprint feature and an incoming call number, so as to identify the real identity and intention of the caller and systematically generalize four decided results; aiming at each result, a different prompt is given to the user on the mobile phone interface.

2. Each record in the address book database of the user may include three basic fields: the mobile phone number, the name, and the voiceprint feature; the database may be stored in the mobile phone locally or in the cloud.

3. The mobile phone number and the name are explicit data, and may be displayed on the mobile phone interface of user, and the voiceprint feature is usually implicit data, and is not needed to be displayed on the user interface; that is, information of the voiceprint feature is transparent to the user, there is no need to make various operations performed by the mobile phone on voiceprint feature parameters closed to the user, and the user has no need to pay attention to the existence of the voiceprint feature.

4. For facilitating the inquiry of the voiceprint feature, an index table of the voiceprint feature may be built in the database.

5. After the user answers an incoming call, the mobile phone extracts the voiceprint feature from the voice of the opposite user.

6. First the voiceprint feature is inquired in the address book database of the user, and then the next processing is performed according to the matching result.

7. Furthermore, the incoming call number is inquired in the address book database, and then the next processing is performed according to the matching result.

8. According to the matching result of the voiceprint feature and the mobile phone number, there are three situations as follows:

1) If both the voiceprint feature and the mobile phone number are matched correctly, the name of the incoming call number is displayed normally, and no special prompt is given.

2) If the voiceprint feature may be matched, but the mobile phone number cannot be matched, special prompt information is added to display on a call interface except the name XXX of the caller, so as to prompt the user that the caller is an acquaintance, but uses a new number, for example, "please note that XXX is using a new number to talk with you".

3) If the voiceprint feature cannot be matched, but the mobile phone number may be matched, special prompt information is added to display on the call interface except the name XXX of the caller, so as to prompt the user that the mobile phone number is familiar, but the caller is a stranger, for example, "please note that the caller talking with you now is not XXX".

4) If both the voiceprint feature and the mobile phone number cannot be matched, only the mobile phone number of the caller is displayed on the call interface, at the same time, the special prompt information is added, for example, "the number is not in the address book, save or not?"; the user may choose whether to save the number; if the user chooses to save, the name, mobile phone number, voiceprint feature of the record are saved in the address book database.

It can be seen from the above technical features that using the method of the embodiment of the present disclosure enables the user to timely find, during a call, the real identity of the caller, so as to facilitate the user to make a right decision, which prevents the user form getting loss and protects the interest of the user.

The technical solution is further described in combination with the accompanying drawings.

The basic idea of the embodiment of the present disclosure is that: a field of voiceprint feature is added in the address book database of the user; the voiceprint feature in the voice of the caller is extracted during a call, and then the voiceprint feature is inquired and matched in the address book database in combination with the incoming call number, so as to identify the real identity of the caller; and the related prompt information is given to the user according to four different matching results.

Figure 5:
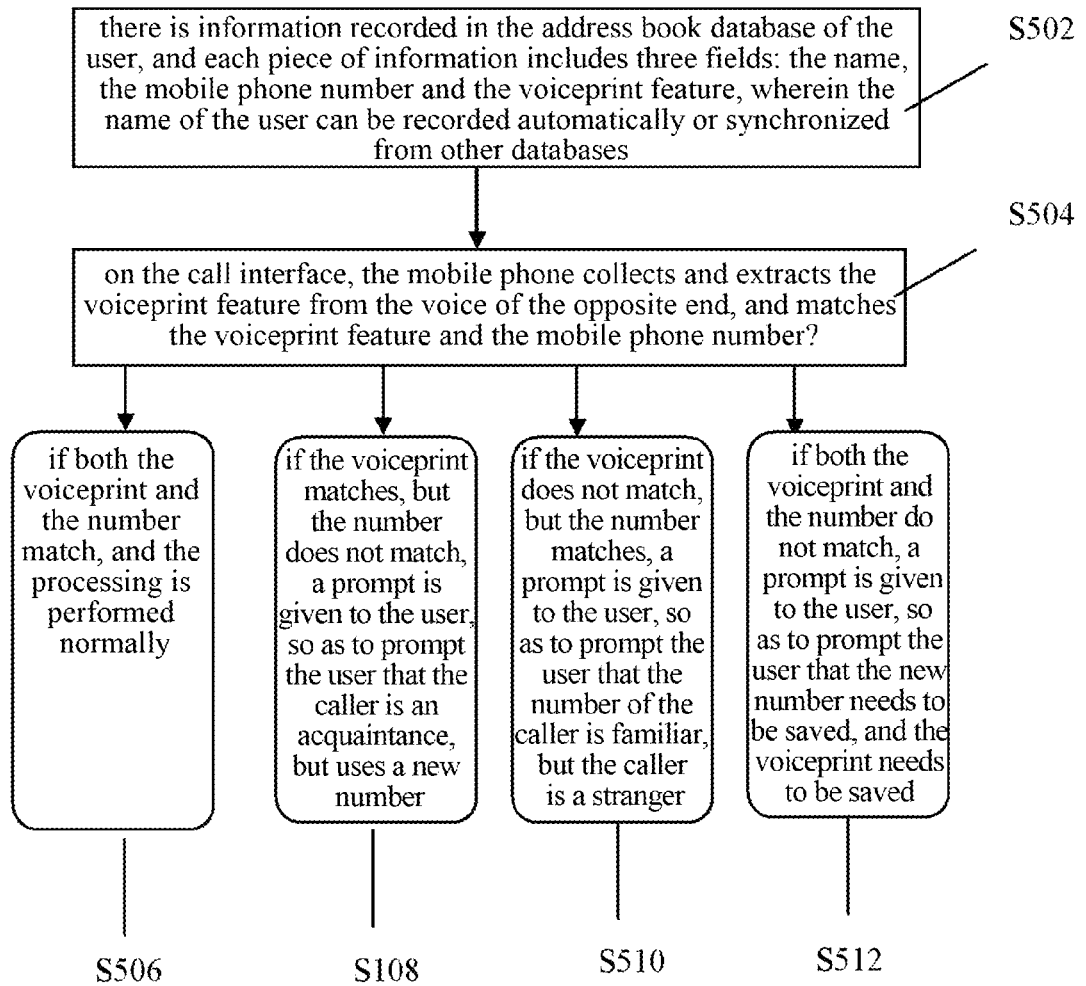
FIG. 5 is a flowchart of a method for answering a call by means of a mobile phone automatically identifying a user according to an embodiment of the present disclosure.

FIG. 5 is a flowchart of a method for answering a call by automatically identifying the mobile phone of a user according to an embodiment of the present disclosure; as shown in FIG. 5, the flow includes the following steps.

Step S502: there is information recorded in the address book database of the user, and each piece of information includes three fields: the name, the mobile phone number and the voiceprint feature, herein the name of the user may be recorded automatically or synchronized from other databases.

The method is based on that each record in the address book database of the user saves data of the field voiceprint feature, so the address book of the user is required to have the three basic fields; if there is not the field voiceprint feature in the address book, the mobile phone cannot judge accurately the real identity of a caller. The database may be built by the user gradually; for example, after the first call, voiceprint information of the caller may be saved for later use; and moreover, the user may also perfect the voiceprint information in his/her own address book by means of other existing databases.

Step S504: on the call interface, the mobile phone collects and extracts the voiceprint feature from the voice of the caller, and matches the voiceprint feature and the mobile phone number.

After setting up a call, the mobile phone may automatically collect the voice information of the caller; after there is enough information data, the mobile phone may extract the voiceprint feature by a voiceprint identifying device and convert the voiceprint feature into the voiceprint data format saved in the address book database of the mobile phone, so as to facilitate matching; the mobile phone first matches the voiceprint feature with all the voiceprint features in the database, if a record A in the database is matched, then the incoming call number is matched with the number saved in the record A, if they match successfully, it is to proceed to Step S506; if they do not match successfully, it is to proceed to Step S508. If there is no any record in the database matched, the mobile phone uses the incoming call number to inquire, if the incoming call number matches a record B in the database, turn to Step S510; if the incoming call number does not match any record in the database, it is to proceed to Step S512.

Step S506: if both the voiceprint and the number match, and the processing is performed normally.

If the voiceprint feature and the mobile phone number may successfully match a record in the address book of the mobile phone, it is indicated that the caller is really in a normal record of the address book, then the processing is performed normally in this case; that is, only the name of the caller is displayed on the call interface, and there is no need to give a special prompt.

Step S508: if the voiceprint matches, but the number does not match, a prompt is given to the user, so as to prompt the user that the caller is an acquaintance, but uses a new number.

If the voiceprint feature may match, it is indicated that the caller is an acquaintance, and the information of the caller has been saved in the address book; but the number of this incoming call is different from the mobile phone number of last incoming call, which means that the caller uses a new mobile phone number. As for why the caller uses a new mobile phone number, the user needs to judge for himself, and the mobile phone may give the prompt information on the call interface. If it is confirmed that the caller is an acquaintance who changes a mobile phone number, then the user may update the mobile phone number by himself/herself.

Step S510: if the voiceprint does not match, but the number matches, a prompt is given to the user, so as to prompt the user that the number of the caller is familiar, but the caller is a stranger.

If the voiceprint feature cannot match, it is indicated that the caller did not call before, and is a stranger, but the number of this incoming call is saved in the address book, which means the caller is using the mobile phone of the number owner, or obtains the mobile phone of the number owner illegally; in this case, the user needs to be on high alert to the intention of the caller, and the mobile phone may give the prompt information on the call interface.

Step S512: if both the voiceprint and the number do not match, a prompt is given to the user, so as to prompt the user that the new number needs to be saved, and the voiceprint needs to be saved while the user performs a saving action.

If both the voiceprint feature and the number cannot match, it is indicated that the incoming call number is strange; as for whether the user wants to add the number in the address book database, it depends on the user, and the mobile phone only gives the prompt information.

The technical solution of the present disclosure is elaborated below in combination with the following specific case.

When a user uses the mobile phone, he needs to build an address book database containing the voiceprint feature by himself, and the database may generally be stored locally or on a cloud. The user may call someone he/she knows, and then save the call log, then the voiceprint information of the other party may be saved in the database. The user may adopt other modes to synchronize the voiceprint information to his/her own address book database, which will not be elaborated herein.

Several possible scenarios are conceived.

Scenario 1: one day, Wang received a call, and the call interface displayed that the call was from his classmate, so he answered immediately and talked with the classmate kindly because they have not seen each other for a long time; after they chatted a bit, the mobile phone took the following action in background: extracting the voiceprint from the voice of the classmate and matching the voiceprint with the contact record of the classmate, finding that the voiceprint information was consistent with the record, then confirming the caller to be Wang's classmate; the mobile phone did not give any abnormal prompt on the call interface, so Wang continued chatting with his classmate safely.

Scenario 2: one day, Wang received a call, and the call interface displayed that the call was from his friend XXX, so he answered immediately, and the caller sounded like his friend; the caller told Wang that he was in the hospital now because of getting into a car accident on road and needed to pay medial bills in advance, because he could not contact his family, now he hoped Wang to help by payment; Wang usually has a good relationship with this friend, as he was hesitating, the mobile phone took the following action in background: extracting the voiceprint from the voice of the friend and matching the voiceprint with the contact record of the friend, finding that the voiceprint information is inconsistent with the record, then giving an abnormal prompt "the person talking with you is not XXX, please be vigilant" on the interface of mobile phone; Wang contacted the real friend XXX in other ways and confirmed that XXX just lost his mobile phone while keeping the person on line, and then Wang called the police immediately.

Scenario 3: one day, Wang received a call, and the call interface displayed that it was a strange number; Wang answered immediately, and the caller sounded like his dad, why did dad use a new number? The mobile phone took the following action in background: extracting the voiceprint from the voice and matching the voiceprint with the record of dad's mobile phone number, finding that the voiceprint information was indeed consistent with the record of dad's mobile phone number, then giving an abnormal prompt "the person talking with you is your dad, but he uses a new number" on the call interface; subsequently, Wang asked to confirm that dad changed a new mobile phone, so Wang saved the new number to the mobile phone safely.

Scenario 4: one day, Wang received a call, and the call interface displayed that it was a strange number; Wang answered immediately, but could not identify the caller, then the mobile phone took the following action in background: extracting the voiceprint from the voice; but no record was matched in background; after talking with the caller, Wang found that the call was a sales call, so he did not record the number.

Figure 6:
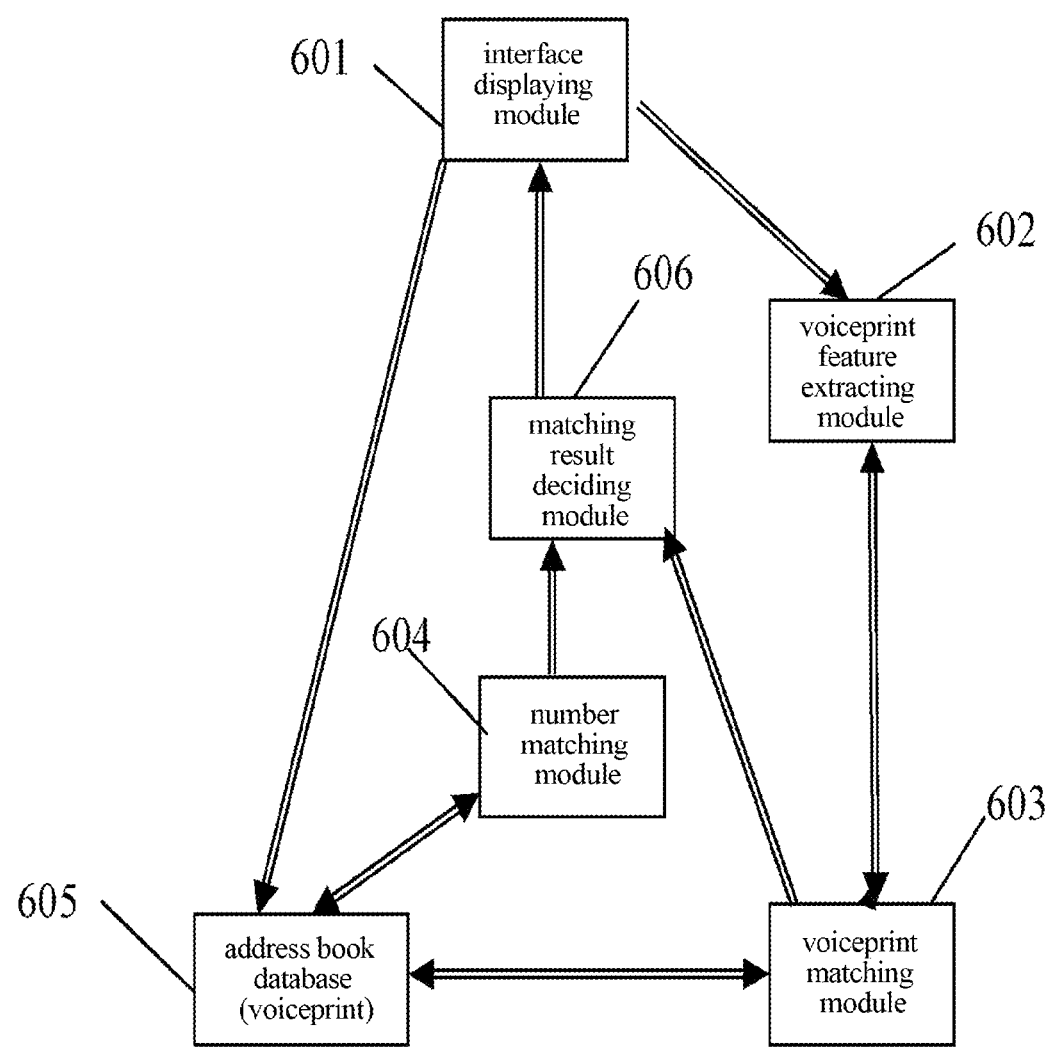
FIG. 6 is a structure diagram of a device for answering a call by means of a mobile phone automatically identifying a user according to an embodiment of the present disclosure.

The embodiment of the present disclosure further provides a device for answering a call by means of a mobile phone automatically identifying a user. FIG. 6 is a structure diagram of a device for answering a call by means of a mobile phone automatically identifying a user according to an embodiment of the present disclosure; as shown in FIG. 6, the device includes: an interface displaying module 601, a voiceprint feature extracting module 602, a voiceprint matching module 603, a number matching module 604, an address book database (voiceprint) 605, and a matching result deciding module 606;

the interface displaying module 601 includes an incoming call interface and a call interface; on the incoming call interface, the name of the caller may be extracted from the address book database (voiceprint) 605 according to the incoming call number and displayed to the user; on the call interface, it is responsible for displaying the real information of the user and prompt words, and forwarding sound data to the voiceprint feature extracting module 602;

the voiceprint feature extracting module 602 extracts the valid voiceprint feature from the voice information collected during a call, and converts the voiceprint feature into the voiceprint data format saved in the address book database, so as to facilitate comparison;

the voiceprint matching module 603 takes charge of comparing the valid voiceprint data with the existing information in the database, and feeds back a matching result; for improving the speed of inquiring and matching, it is feasible to perform Hash indexing on voiceprint data and establish an index table of the voiceprint data;

the number matching module 604 takes charge of comparing the incoming call number with the existing information in the database; generally, the mobile phone has this functional module, but different algorithms lead to different matching speeds;

each record in the address book database (voiceprint) 605 saves mainly three basic fields (the mobile phone number, the name, and the voiceprint feature), compared with the traditional address book database, a voiceprint field is added, and the attribute of the voiceprint field may be set as only visible to the mobile phone and invisible to the user; and moreover, the address book database (voiceprint) 605 may be stored locally or in the cloud; the data stored locally and in the cloud may be synchronized;

the matching result deciding module 606 gives related judgement information in combination with four matching results of the voiceprint and the mobile phone number, and provides the judgement information to the interface displaying module 601 to display.

To sum up, according to the method or device provided by the embodiment of the present disclosure, by using the voiceprint identifying technology, the mobile phone may identify the real information of the caller when the user answers a call, and may give a prompt to the user timely by analyzing the decided results, so as to prevent the user from fraud. When the user uses the device, the mobile phone may automatically identify the identity of the caller, and gives the prompt information to the user timely when finding that there is something wrong with the incoming call, so as to prevent the user from fraud.

Obviously, those skilled in the art should appreciate that the above modules and steps of the present disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device, or they are made into integrated circuit modules, respectively, or multiple modules or steps of them are made into a single integrated circuit module to implement. Thus, the present disclosure is not limited to any particular combination of hardware and software.

The above is only the embodiment of the present disclosure and not intended to limit the present disclosure; for those skilled in the art, the present disclosure may have various modifications and changes. Any modifications, equivalent replacements, improvements and the like within the spirit and principle of the present disclosure shall fall within the scope of protection of the present disclosure.

INDUSTRIAL APPLICABILITY

As above mentioned, an identity identifying method and device and a communication terminal provided by the embodiment of the present disclosure have the following beneficial effect: a method for effectively identifying the identity of the current call object is provided, which technically reduces the probability of phone fraud on a user.

What is claimed is:

1. A method for identifying an identity, comprising:
   extracting a voiceprint feature of a current call object and a mobile phone number of the current call object; and
   identifying an identity of the current call object according to the voiceprint feature and the mobile phone number, comprising: inquiring a corresponding data record saved in an address book database according to the extracted voiceprint feature and mobile phone number; judging a matching result of the extracted voiceprint feature and mobile phone number and the corresponding data record; and, identifying the identity of the current call object according to the matching result;
   wherein judging the matching result of the extracted voiceprint feature and mobile phone number and the corresponding data record comprises: judging whether there is a record about the extracted voiceprint feature in the address book database, and judging whether the mobile phone number corresponding to the voiceprint feature and recorded in the address book database matches the extracted mobile phone number, the matching result is that there is a record about the extracted voiceprint feature in the address book database, but the mobile phone number corresponding to the voiceprint feature and recorded in the address book database does not match the extracted mobile phone number.

2. The method according to claim 1, wherein extracting the voiceprint feature comprises:
   collecting voice information of the current call object;
   extracting the voiceprint feature according to the voice information; and
   converting the voiceprint feature into a predetermined voiceprint data format.

3. The method according to claim 2, wherein after identifying the identity of the current call object according to the voiceprint feature and the mobile phone number, the method further comprises:
   displaying prompt information during a call and/or after a call according to an identification result of the identity of the current call object, wherein the prompt information comprises at least one of the followings: a matching result of the voiceprint feature and mobile phone number and records saved in the address book database, a matching degree between the voiceprint feature and a voiceprint feature recorded in the address book database, security risk prompt information aiming at different identification results, and the mobile phone number and other address book information corresponding to the mobile phone number.

4. The method according to claim 1, further comprising:
   adding a new data record to the address book database according to the mobile phone number input by a user and the collected voiceprint feature; and/or importing the saved data record to the address book database.

5. The method according to claim 4, wherein after identifying the identity of the current call object according to the voiceprint feature and the mobile phone number, the method further comprises:
   displaying prompt information during a call and/or after a call according to an identification result of the identity of the current call object, wherein the prompt information comprises at least one of the followings: a matching result of the voiceprint feature and mobile phone number and records saved in the address book database, a matching degree between the voiceprint feature and a voiceprint feature recorded in the address book database, security risk prompt information aiming at different identification results, and the mobile phone number and other address book information corresponding to the mobile phone number.

6. The method according to claim 1, wherein inquiring the corresponding data record saved in the address book database according to the extracted voiceprint feature and mobile phone number comprises:
   inquiring the voiceprint feature corresponding to the mobile phone number and saved in the address book database according to the extracted mobile phone number, and/or inquiring the mobile phone number corresponding to the voiceprint feature and saved in the address book database according to the extracted voiceprint feature.

7. The method according to claim 6, wherein after identifying the identity of the current call object according to the voiceprint feature and the mobile phone number, the method further comprises:
   displaying prompt information during a call and/or after a call according to an identification result of the identity of the current call object, wherein the prompt information comprises at least one of the followings: a matching result of the voiceprint feature and mobile phone number and records saved in the address book database, a matching degree between the voiceprint feature and a voiceprint feature recorded in the address book database, security risk prompt information aiming at different identification results, and the mobile phone number and other address book information corresponding to the mobile phone number.

8. The method according to claim 1, wherein identifying the identity of the current call object according to the matching result comprises in a condition that the matching result is that there is a record about the extracted voiceprint feature in the address book database, but the mobile phone number corresponding to the voiceprint feature and recorded in the address book database does not match the extracted mobile phone number, identifying that the mobile phone number of the current call object has been changed.

9. The method according to claim 1, wherein after identifying the identity of the current call object according to the voiceprint feature and the mobile phone number, the method further comprises:

displaying prompt information during a call and/or after a call according to an identification result of the identity of the current call object, wherein the prompt information comprises at least one of the followings: a matching result of the voiceprint feature and mobile phone number and records saved in the address book database, a matching degree between the voiceprint feature and a voiceprint feature recorded in the address book database, security risk prompt information aiming at different identification results, and the mobile phone number and other address book information corresponding to the mobile phone number.

10. The method according to claim 1, wherein the address book database is stored locally and/or in a remote server.

11. The method according to claim 10, wherein in a condition that the address book database is saved in the remote server, the method further comprises:

synchronizing the address book database stored locally and the address book database saved in the remote server.

12. The method according to claim 10, wherein the address book database is stored locally and/or in the remote server in an encryption mode.

13. A device for identifying an identity, comprising at least one processor executing an extracting module and an identifying module, wherein:

said extracting module is arranged to extract a voiceprint feature of a current call object and a mobile phone number of the current call object; and said identifying module is arranged to identify the identity of the current call object according to the voiceprint feature and the mobile phone number;

wherein the identifying module comprises:

an inquiring unit, which is arranged to inquire a corresponding data record saved in an address book database according to the extracted voiceprint feature and mobile phone number;

a judging unit, which is arranged to judge a matching result of the extracted voiceprint feature and mobile phone number and the corresponding data record by: judging whether there is a record about the extracted voiceprint feature in the address book database, and judging whether the mobile phone number corresponding to the voiceprint feature and recorded in the address book database matches the extracted mobile phone number, wherein the matching result is that there is a record about the extracted voiceprint feature in the address book database, but the mobile phone number corresponding to the voiceprint feature and recorded in the address book database does not match the extracted mobile phone number; and an identifying unit, which is arranged to identify the identity of the current call object according to the matching result.

14. The device according to claim 13, wherein the extracting module comprises:

a collecting unit, which is arranged to collect voice information of the current call object; an extracting unit, which is arranged to extract the voiceprint feature according to the voice information; and a converting unit, which is arranged to convert the voiceprint feature into a predetermined voiceprint data format.

15. A communication terminal, comprising a device for identifying an identity according to claim 13.

* * * * *